(No Model.)
F. B. RAE.
CROSS-OVER SWITCH FOR ELECTRIC RAILWAYS.
No. 495,615. Patented Apr. 18, 1893.
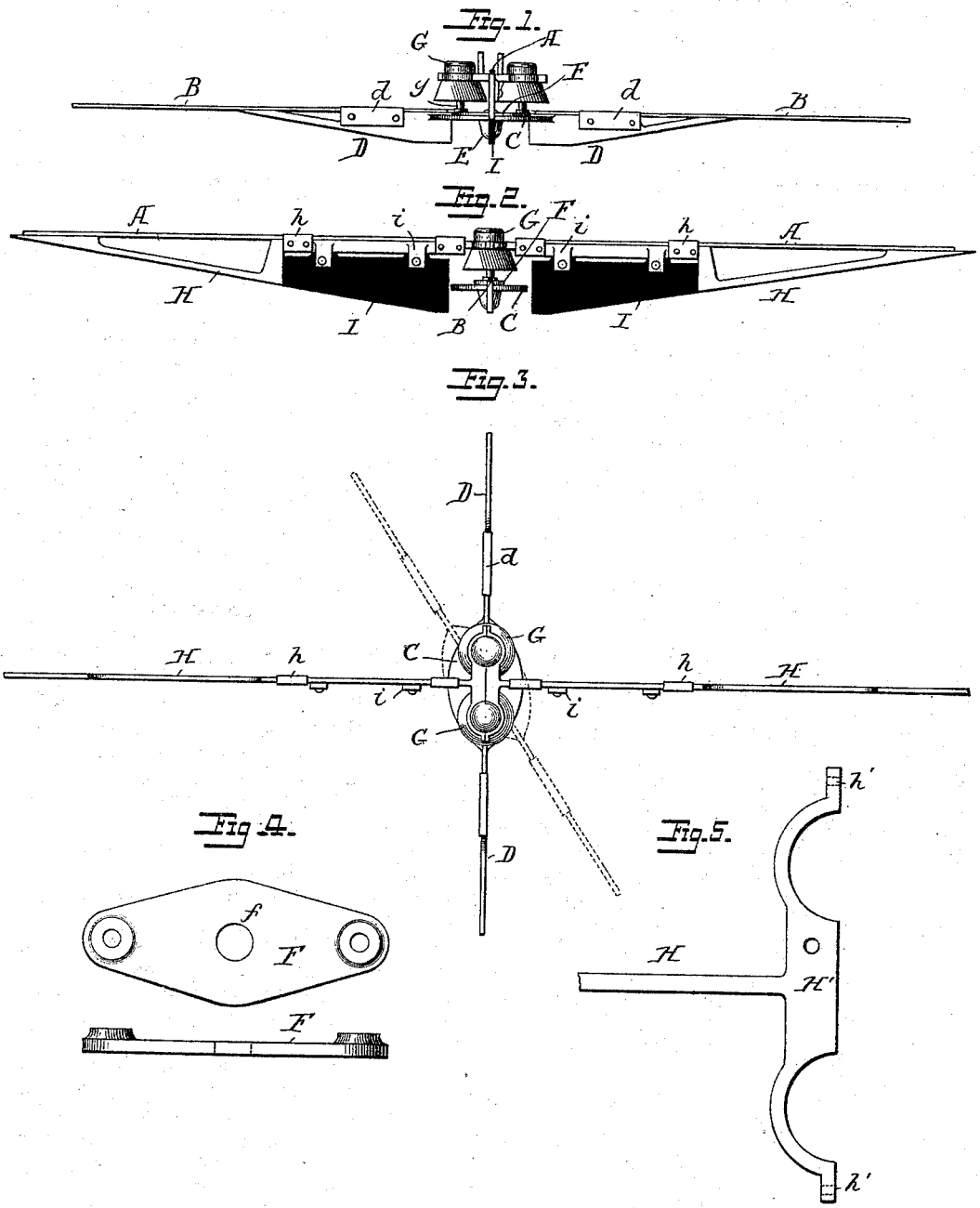
WITNESSES
INVENTOR
Frank B. Rae
by Foster & Freeman
Attorneys

United States Patent Office.

FRANK B. RAE, OF DETROIT, MICHIGAN, ASSIGNOR TO THE DETROIT ELECTRICAL WORKS, OF SAME PLACE.

CROSS-OVER SWITCH FOR ELECTRIC RAILWAYS.

SPECIFICATION forming part of Letters Patent No. 495,615, dated April 18, 1893.

Application filed April 11, 1891. Serial No. 388,467. (No model.)

*To all whom it may concern:*

Be it known that I, FRANK B. RAE, a citizen of the United States, residing at Detroit, in the county of Wayne and State of Michigan, have invented certain new and useful Improvements in Cross-Over Switches for Electric Railways, of which the following is a specification.

My invention relates to cross overs for trolley lines for electric railways by means of which the trolleys of either one of two independent electric railways may pass or cross the trolley lines of the other without interfering therewith, or causing a disturbance in the electric circuit, and my invention consists in a cross over having the general features of construction and arrangement hereinafter more particularly pointed out.

Referring to the accompanying drawings, Figure 1, is a side view showing more particularly the arrangement of the under trolley line. Fig. 2, is a side view showing the arrangement of devices connected with the upper of the two crossing trolley wires. Fig. 3, is a plan view of the same; and Figs. 4 and 5 are details on an enlarged scale.

Referring to the drawings, A represents the trolley wire of one of the railroad tracks which in this instance is supported at an elevation slightly above the trolley wire B of the other railroad track, and these wires may be supported in any of the usual ways, as by means of the hangers H attached to suitable guys. The trolley wires are shown as crossing each other at right angles, although it will be evident from the description that they may cross each other at any angle, as indicated by dotted lines Fig. 3, by simply turning and adjusting the parts to the angle desired.

The trolley wire B is provided with the track pieces D tapering toward their outer extremities, and secured to the wire by any suitable means, as the clips d, and these track pieces are connected to the plate C, which forms a connecting link between the track pieces D, and offers a bearing surface upon which the flanges of a trolley wheel will run in its passage between the adjacent end of the track pieces. This plate is provided with a knob or projection E, at its center, which will extend into the groove of the trolley wheel, and prevent its accidental displacement, when passing between the track pieces. Mounted on this plate C, is another plate F, which may be of the construction shown in Fig. 4, and secured to the plate C by a screw passing through the opening $f$, and which screw may serve as a means for adjusting the shafts of the two plates to each other. Mounted upon this plate F, are the standards $g$, supporting the bell-shaped insulators G. The conductor A, which may or may not be continuous as desired, is also provided with track pieces H, tapering toward their outer ends, and secured to the trolley wire by clips $h$, and these track pieces are provided at their inner ends with a cross arm H' formed at its outer ends to embrace the neck of the bell-shaped insulators G, and to be secured together around the neck by screws or bolts passing through the openings $h'$. These track pieces H are considerably longer and wider than the corresponding track pieces D of the other trolley wire in order that the trolley on the trolley wire A may be carried below the trolley conductor B, and so that in passing the trolley conductor B, the flanges of the trolley wheel may bear upon the under side of the plate C.

In order to prevent any arcing between the two circuits, as the trolley passes over the track pieces H, their inner ends are provided with pieces I of insulating material, suitably secured to the track pieces as by the lugs $i$, and thus it will be seen that before the trolley wheel reaches the cross over, the circuit of the car to which it is connected is automatically broken as soon as the trolley reaches the insulating material, and the danger of sparking or arcing is avoided.

It will thus be seen that by an exceedingly simple arrangement, I provide a cross over in which the two crossing lines are rigidly maintained at the proper distances apart, and are completely and thoroughly insulated from each other, the bell-shaped insulator preventing all danger of leakage through moisture collecting on the insulators, and by simply loosening the screw connecting the two plates C and F, the parts may be adjusted to accommodate the cross over to tracks at any angle to each other. Moreover, the parts of the cross over are light and simple of construction, making an exceedingly cheap, as well as effective cross over.

What I claim is—

1. In a cross over, the combination of a plate to which the track pieces of one of the conductors are connected, of a second plate adjustably connected therewith and carrying the insulators to which the track pieces of the other conductor are connected, substantially as described.

2. In a cross over, the combination with a plate to which the track pieces of one conductor are connected, of a second plate adjustably connected therewith, and having standards supporting bell-shaped insulators, and track pieces having cross arms attached to the necks of the bell-shaped insulators, substantially as described.

3. In a cross over, a plate having track pieces connected therewith, and provided with a central extension, a second plate adjustably connected to the first, insulators mounted on said plate, and track pieces having insulating portions near their ends mounted on the insulators, substantially as described.

In testimony whereof I have signed my name to this specification in the presence of two subscribing witnesses.

FRANK B. RAE.

Witnesses:
W. H. PERRETT,
CHARLES J. STUBBS.